United States Patent
Chelin et al.

(10) Patent No.: US 12,492,668 B2
(45) Date of Patent: Dec. 9, 2025

(54) AIRCRAFT NACELLE PROVIDED WITH AT LEAST ONE THRUST REVERSAL DEVICE COMPRISING AT LEAST ONE LONGITUDINAL DEFLECTOR, AIRCRAFT COMPRISING AT LEAST ONE PROPULSION ASSEMBLY COMPOSED OF SUCH A NACELLE

(71) Applicant: Airbus Operations SAS, Toulouse (FR)

(72) Inventors: Frédéric Chelin, Toulouse (FR); Christophe Bourdeau, Toulouse (FR); Olivier Scholz, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/887,483

(22) Filed: Sep. 17, 2024

(65) Prior Publication Data

US 2025/0092847 A1    Mar. 20, 2025

(30) Foreign Application Priority Data

Sep. 20, 2023  (FR) ........................................ 2309936

(51) Int. Cl.
*F02K 1/72* (2006.01)

(52) U.S. Cl.
CPC ...................... *F02K 1/72* (2013.01)

(58) Field of Classification Search
CPC ......... F02K 1/70; F02K 1/72; F05D 2240/129
See application file for complete search history.

(56) References Cited

U.S. PATENT DOCUMENTS

| 3,076,309 A | | 2/1963 | Morris et al. | |
| 3,599,432 A | * | 8/1971 | Ellis | F02K 1/645 |
| | | | | 60/230 |
| 2009/0301056 A1 | * | 12/2009 | Hatrick | F02K 1/72 |
| | | | | 60/226.2 |
| 2014/0369829 A1 | * | 12/2014 | Joret | F02K 1/72 |
| | | | | 415/213.1 |
| 2017/0204810 A1 | * | 7/2017 | Harpal | B64D 33/04 |

(Continued)

FOREIGN PATENT DOCUMENTS

| EP | 3597543 A2 | 1/2020 |
| EP | 4083410 A2 | 11/2022 |
| GB | 882424 A | 11/1961 |

OTHER PUBLICATIONS

French Search Report for corresponding French Patent Application No. 2309936 dated Mar. 14, 2024.

*Primary Examiner* — Andrew H Nguyen (74) *Attorney, Agent, or Firm* — Greer, Burns & Crain, Ltd.

(57) ABSTRACT

An aircraft nacelle provided with a thrust reversal device which comprises at least one diversion system which is configured to divert, in the activated state, an airflow channeled in the nacelle toward a lateral opening of the nacelle, at least one orientation system comprising at least one transverse deflector which is configured to orientate the airflow diverted by the diversion system in the radial directions and toward the upstream end of the nacelle, and at least one longitudinal deflector which is secant to the transverse deflector(s) and which is oriented in a direction which forms an angle of less than 25° with the longitudinal direction.

12 Claims, 4 Drawing Sheets

(56) References Cited

U.S. PATENT DOCUMENTS

| | | | |
|---|---|---|---|
| 2018/0066606 A1* | 3/2018 | Pautis | F02K 1/763 |
| 2018/0340492 A1* | 11/2018 | Harpal | F02K 1/72 |
| 2022/0325679 A1* | 10/2022 | Chilukuri | F02K 1/625 |
| 2023/0032868 A1* | 2/2023 | Samson | F02K 1/72 |
| 2023/0184195 A1* | 6/2023 | Cazuc | F02K 1/72 239/265.37 |
| 2023/0340928 A1* | 10/2023 | Davis | F02K 1/72 |

* cited by examiner

AIRCRAFT NACELLE PROVIDED WITH AT LEAST ONE THRUST REVERSAL DEVICE COMPRISING AT LEAST ONE LONGITUDINAL DEFLECTOR, AIRCRAFT COMPRISING AT LEAST ONE PROPULSION ASSEMBLY COMPOSED OF SUCH A NACELLE

CROSS-REFERENCES TO RELATED APPLICATIONS

This application claims the benefit of French Patent Application Number 2309936 filed on Sep. 20, 2023, the entire disclosure of which is incorporated herein by way of reference.

FIELD OF THE INVENTION

The present application relates to an aircraft nacelle provided with at least one thrust reversal device comprising at least one longitudinal deflector and an aircraft comprising at least one aircraft propulsion assembly composed of such a nacelle.

BACKGROUND OF THE INVENTION

Figure 1:
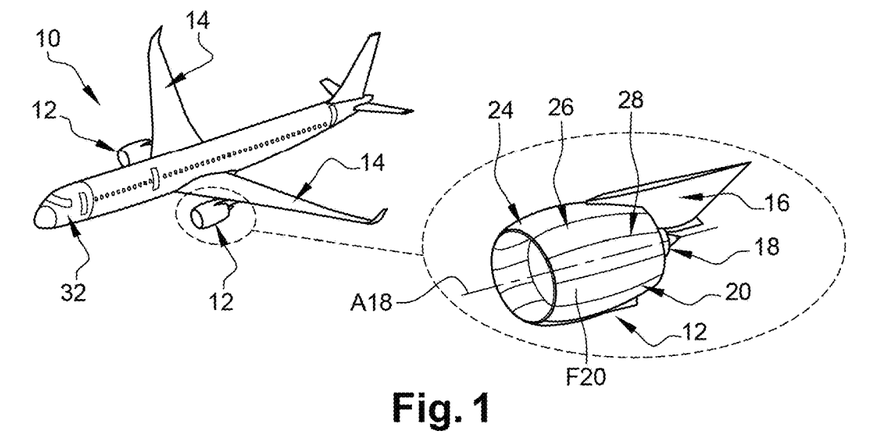
FIG. 1 is a perspective view of an aircraft and a propulsion assembly illustrating an embodiment.
Figure 2:
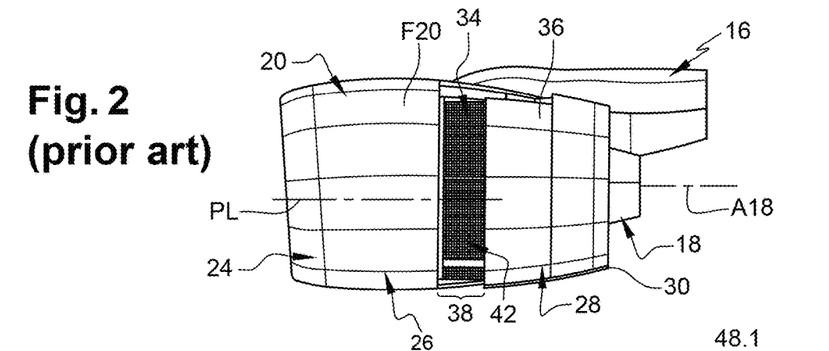
FIG. 2 is a lateral view of a propulsion assembly illustrating an embodiment of the prior art.

According to one embodiment, which is visible in FIGS. 1 to 3, an aircraft comprises a plurality of propulsion assemblies 12 which are positioned below each of the wings 14 of the aircraft 10 and connected thereto by pylons 16. Each propulsion assembly 12 comprises an engine 18 which is positioned inside a nacelle. The engine 18 comprises a fan which has an axis of rotation A18.

For the remainder of the description, a longitudinal direction is parallel to the axis of rotation A18. A longitudinal plane is a plane containing the axis of rotation A18 and a transverse plane is a plane perpendicular to the axis of rotation A18. The terms front/upstream and rear/downstream refer to the direction of flow of an airflow in the nacelle 20, said airflow flowing from front (upstream) to back (downstream).

The nacelle 20 has an approximately tubular shape and delimits with the engine 18 an annular conduit 22 in which a secondary airflow flows. The nacelle 20 comprises an upstream section 24, called the air intake, a central section 26 in which the fan of the engine 18 is positioned, and a downstream section 28 which has a trailing edge 30.

The nacelle 20 comprises a thrust reversal device 34 which is positioned in the region of the downstream section 28 and which is configured to adopt an activated state in which it diverts at least a portion of the secondary airflow circulating in the annular conduit 22 toward the outside and upstream of the nacelle 20, and an inactivated state in which it does not divert the secondary airflow circulating in the annular conduit 22.

The thrust reversal device 34 comprises at least one mobile part 36 making it possible to create at least one lateral opening 38 (visible in FIG. 2) passing through the nacelle 20.

The thrust reversal device 34 comprises a diversion system 40 which is configured to adopt a retracted position when the thrust reversal device 34 is in the inactivated state in which the diversion system does not interfere with the secondary airflow, and a deployed position (visible in FIG. 3) when the thrust reversal device 34 is in the activated state in which the diversion system 40 interferes with the secondary airflow and orients the secondary airflow toward the lateral opening 38.

The thrust reversal device 34 also comprises an orientation system 42 which is configured to orientate the airflow diverted by the diversion system 40. According to one embodiment, the orientation system 42 comprises a plurality of cascades 44, 46, 48 which are positioned in the region of each lateral opening 38 and which are each composed of first walls positioned in approximately (+/−10%) longitudinal planes and second walls positioned in approximately transverse planes. The second walls are vane-shaped in order to divert upstream the airflow exiting via each lateral opening 38.

Figure 3:
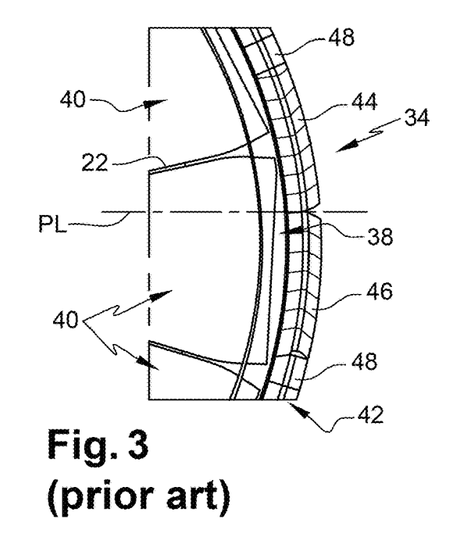
FIG. 3 is a cross section of a part of a thrust reversal device illustrating an embodiment of the prior art.

According to an arrangement which is visible in FIG. 3, the orientation system 42 comprises, perpendicular to the opening 38, first and second cascades 44, 46 positioned on either side of a longitudinal plane PL and third cascades 48 positioned on either side of the first and second cascades 44, 46.

Figure 4:
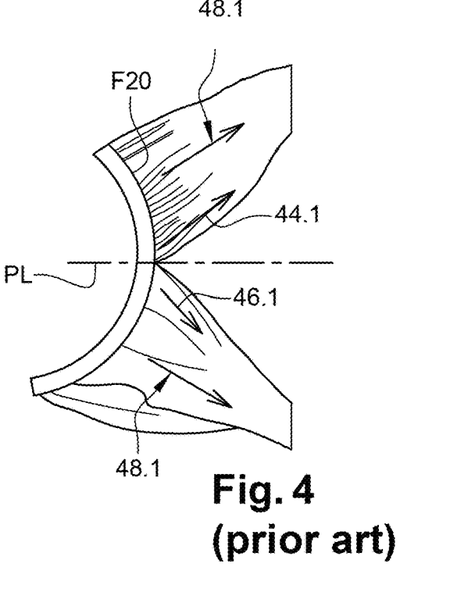
FIG. 4 is a schematic view of the airflow exiting from the thrust reversal device visible in FIG. 3.

As illustrated in FIGS. 3 and 4, each third cascade 48 is configured to orientate the airflow 48.1, which passes through the third cascade, in a radial direction and toward the upstream end of the nacelle 20. The first cascade 44 which is positioned above the plane PL is configured to orientate the airflow 44.1, which passes through the first cascade, toward the upstream end of the nacelle 20 and to the top relative to a radial direction. The second cascade 46 which is positioned below the plane PL is configured to orientate the airflow 46.1, which passes through the second cascade, toward the upstream end of the nacelle 20 and to the bottom relative to a radial direction.

This embodiment is not satisfactory since the cascades 44, 46, 48 have a non-negligible mass.

SUMMARY OF THE INVENTION

The present invention aims to remedy entirely or partially the aforementioned drawbacks.

To this end, the subject of the invention is an aircraft nacelle which has an external surface extending between the upstream and downstream ends and which is configured to channel an airflow flowing in a longitudinal direction from the upstream end to the downstream end, the nacelle being composed of at least one thrust reversal device which comprises:
  at least one lateral opening which is spaced apart from the upstream and downstream ends and passes through the nacelle,
  at least one mobile part which is configured to adopt a first position corresponding to an inactivated state of the thrust reversal device and in which the mobile part closes off the lateral opening, and a second position corresponding to an activated state of the thrust reversal device and in which the mobile part at least partially opens up the lateral opening,
  at least one diversion system which is configured to adopt a retracted position when the thrust reversal device is in the inactivated state in which the diversion system does not interfere with the airflow channeled by the nacelle, and a deployed position when the thrust reversal device is in the activated state in which the diversion system interferes with the airflow channeled by the nacelle and orientates the airflow in the radial directions toward the lateral opening,
  at least one orientation system which is configured to orientate the airflow diverted by the diversion system.

According to the invention, the orientation system comprises:
- at least one transverse deflector which is positioned approximately in a plane perpendicular to the longitudinal direction and which is configured to orientate the airflow diverted by the diversion system in the radial directions and toward the upstream end of the nacelle,
- at least one longitudinal deflector which is secant to the transverse deflector(s) and which is orientated in a direction which forms an angle of less than 25° with the longitudinal direction.

This configuration makes it possible to reduce the mass of the orientation system. The presence of at least one longitudinal deflector increases the efficiency of the transverse deflector(s).

According to a further feature, the lateral opening is delimited by the upper and lower edges substantially parallel to the longitudinal direction and by the upstream and downstream edges positioned in substantially transverse planes. In addition, each deflector comprises first and second ends respectively connected to the upstream and downstream ends of the lateral opening and internal and external edges, the internal edge being closer to the diversion system than the external edge.

According to a further feature, each transverse deflector has internal and external edges, the internal edge being closer to the diversion system than the external edge, and the internal edges of each transverse deflector and of each longitudinal deflector being secant and positioned on the same surface and/or the external edges of each transverse deflector and of each longitudinal deflector being secant and positioned on the same surface.

According to a further feature, at least one longitudinal deflector is orientated in a direction substantially parallel to the longitudinal direction and is positioned in a longitudinal plane.

According to a further feature, at least one longitudinal deflector is oriented in a direction forming an angle of between 5° and 10° with the longitudinal direction.

According to a further feature, each longitudinal deflector has a height which reduces from the first end to the second end.

According to a further feature, at least one longitudinal deflector comprises an upstream part which extends from the first end, the height being uniform in the region thereof, and a downstream part which extends from the upstream part to the second end, the height reducing progressively in the region thereof from the upstream part to the second end.

According to a further feature, at least one longitudinal deflector has a height which reduces incrementally from the first end to the second end, the height being substantially uniform between two consecutive transverse deflectors.

According to a further feature, each longitudinal deflector is present in the form of a blade.

According to a further feature, the orientation system comprises a plurality of longitudinal deflectors positioned symmetrically relative to a plane of symmetry.

According to a further feature, the orientation system comprises a central longitudinal deflector which has a T-shaped or V-shaped cross section and which is positioned in the region of the plane of symmetry, lateral longitudinal deflectors which are positioned symmetrically relative to the plane of symmetry between the central longitudinal deflector and each upper or lower edge of the lateral opening, including a plurality of lateral longitudinal deflectors spaced slightly apart from one another, substantially parallel to one another and closer to the upper or lower edge of the lateral opening than the central longitudinal deflector, and a lateral longitudinal deflector slightly spaced apart from the central longitudinal deflector.

A further subject of the invention is an aircraft comprising at least one nacelle according to one of the preceding features.

BRIEF DESCRIPTION OF THE DRAWINGS

Further features and advantages will be found in the following description of the invention, the description being provided solely by way of example and with reference to the accompanying drawings, in which.

DETAILED DESCRIPTION OF THE PREFERRED EMBODIMENTS

Figure 5:
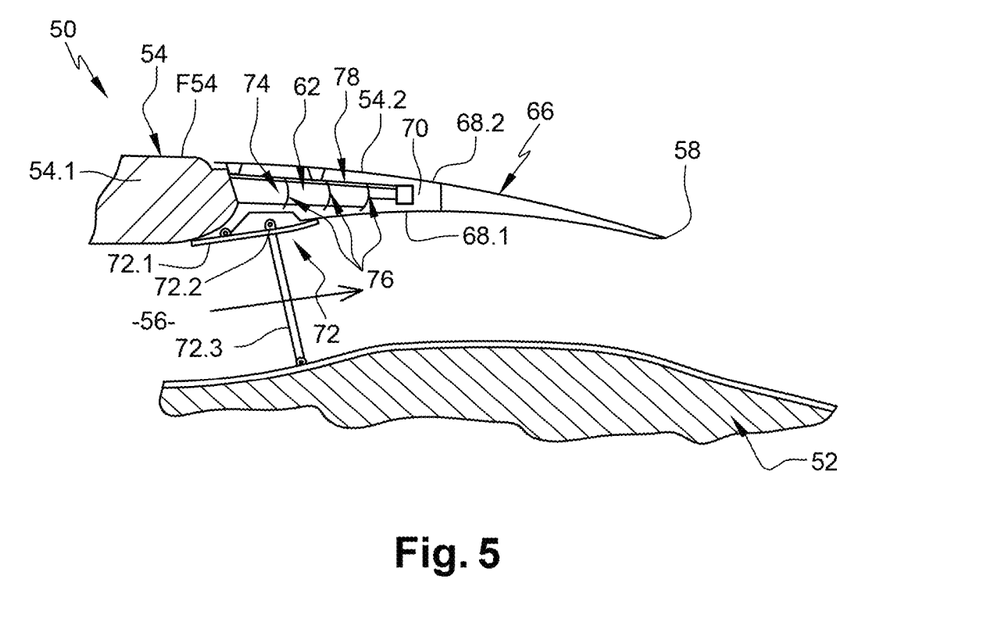
FIG. 5 is a schematic section of a propulsion assembly provided with a thrust reversal device in the inactivated state illustrating an embodiment of the invention.
Figure 6:
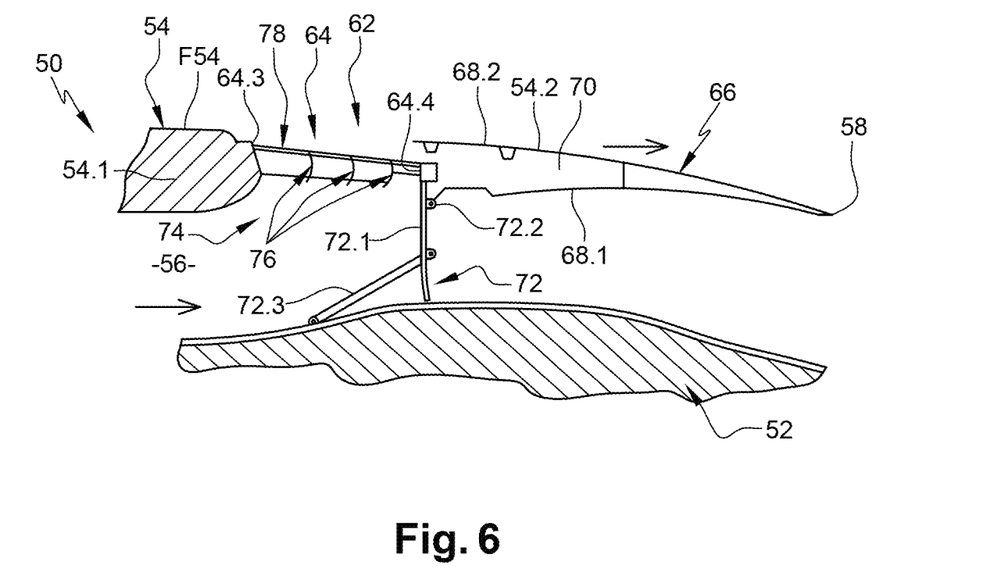
FIG. 6 is a schematic section of the propulsion assembly visible in FIG. 5, the thrust reversal device being in the activated state.

According to an embodiment which is visible in FIGS. 5 and 6 a propulsion assembly 50 comprises an engine 52 positioned inside a nacelle 54. The engine has an engine axis A52 (visible in FIGS. 7 and 10). The nacelle 54 has an approximately tubular shape and delimits with the engine 52 an annular conduit 56 in which a secondary airflow flows. The nacelle 54 comprises an upstream part 54.1 and a downstream part 54.2 which has a trailing edge 58. The nacelle 54 has an external surface F54. According to one arrangement, the nacelle 54 can comprise at least one sensor positioned in the region of a zone of the external surface F54 of the nacelle 54 in a sensor longitudinal plane PL.

According to one application, an aircraft comprises a fuselage, an airfoil and at least one such propulsion assembly connected to the fuselage or to the airfoil. Whatever the embodiment, the nacelle 54 is tubular and extends between the upstream and downstream ends. The nacelle 54 is configured to channel an airflow in a longitudinal direction from the upstream end to the downstream end.

The nacelle 54 comprises at least one thrust reversal device 62 which is positioned in the region of the downstream part 54.2 and which is configured to adopt an activated state (visible in FIG. 6) in which it diverts at least one part of the secondary airflow circulating in the annular conduit 56 toward the outside and the upstream end of the nacelle 54, and an inactivated state (visible in FIG. 5) in which it does not divert the secondary airflow circulating in the annular conduit 56.

The thrust reversal device 62 comprises at least one lateral opening 64 passing through the nacelle 54 and spaced apart from the upstream and downstream ends of the nacelle 54, which is configured to place the annular conduit 56 and the exterior of the nacelle 54 in communication, in particular its external surface F54, and at least one mobile part 66 configured to adopt a first position corresponding to the inactivated state of the thrust reversal device 62, visible in FIG. 5, in which the mobile part 66 closes off the lateral opening 64, and a second position corresponding to the activated state of the thrust reversal device 62, visible in FIG. 6, in which the mobile part 66 at least partially opens up the lateral opening 64.

According to one embodiment, the nacelle 54 comprises two lateral openings 64 which are substantially symmetrical relative to a vertical longitudinal plane passing through the engine axis A52. Each lateral opening 64 is delimited by upper and lower edges 64.1, 64.2 substantially parallel to the longitudinal direction, and by upstream and downstream edges 64.3, 64.4 positioned in substantially transverse planes.

According to one configuration, the downstream part 54.2 is an O-shaped mobile tubular cowl, forming the mobile part 66, which is translated in the longitudinal direction between a closed position (visible in FIG. 5) in which the downstream part 54.2 is in contact with the upstream part 54.1 when the thrust reversal device 62 is in the inactivated state, and an open position (visible in FIG. 6) in which the downstream part 54.2 is spaced apart from the upstream part 54.1 so as to create the lateral opening(s) 64 between the upstream and downstream parts 54.1, 54.2 when the thrust reversal device 62 is in the activated state. The downstream part 54.2 comprises an internal wall 68.1 and an external wall 68.2 connected in the region of the trailing edge 58, the internal and external walls 68.1, 68.2 delimiting with one another a cavity 70 which is open in the direction of the upstream part 54.1.

Naturally the invention is not limited to this configuration of the mobile part 66.

The thrust reversal device 62 comprises at least one diversion system 72 which is configured to adopt a retracted position (visible in FIG. 5) when the thrust reversal device 62 is in the inactivated state in which the diversion system 72 does not interfere with the secondary airflow channeled in the annular conduit 56, and a deployed position (visible in FIG. 6) when the thrust reversal device 62 is in the activated state in which the diversion system 72 is deployed in the annular conduit 56, interferes with the secondary airflow and orientates the secondary airflow in the radial directions (perpendicular to the longitudinal direction) toward the lateral opening 64.

According to one embodiment, for each lateral opening 64 the diversion system 72 comprises at least one panel 72.1 and for each panel 72.1 at least one hinge 72.2 connecting the panel 72.1 to the nacelle 54 (in particular to the mobile part 66) and at least one link 72.3 connecting the panel 72.1 to the engine 52. Naturally, the invention is not limited to this embodiment of the diversion system 72.

The thrust reversal device 62 also comprises at least one orientation system 74 which is configured to orientate at least one part of the secondary airflow diverted by the diversion system 72 and exiting via the lateral opening 64. According to one arrangement, the orientation system 74 is positioned in the region of the lateral opening 64.

According to one arrangement, the orientation system 74 and the cavity 70 are configured such that in the inactivated state the orientation system 74 is housed in the cavity 70.

According to one embodiment, the orientation system 74 comprises at least one transverse deflector 76 which is positioned approximately in a transverse plane composed of a first end 76.1 connected to the upper edge 64.1 and a second end 76.2 connected to the lower edge 64.2. Each transverse deflector 76 has internal and external edges 76.3, 76.4, which are curved substantially in a circular arc, connecting the first and second ends 76.1, 76.2, the internal edge 76.3 being closer to the diversion system 72 than the external edge 76.4. According to one configuration, the internal and external edges 76.3, 76.4 have curvatures adapted to those of the internal and external walls 76.3, 76.4 of the downstream part 54.2 of the nacelle 54 so that the orientation system 74 can be housed in the cavity 70 when the thrust reversal device 62 is in the inactivated state.

Each transverse deflector 76 is configured to orientate, in the radial directions and toward the upstream end, the airflow diverted by the diversion system 72 and exiting from the lateral opening 64.

According to one embodiment, each transverse deflector 76 comprises a blade which has the shape of a portion of a circular crown and which has a concave curvature in the longitudinal planes (the internal and external edges 76.3, 76.4 being closer to the upstream end of the nacelle 54 than the remainder of the transverse deflector 76).

According to one configuration, each transverse deflector 76 has a uniform width (distance separating the internal and external edges 76.3, 76.4) and curvature between its first and second ends 76.1, 76.2. Thus the airflow exiting from the nacelle 54 is substantially uniform over the circumference of the nacelle 54. According to one arrangement, the transverse deflectors 76 have different widths from one transverse deflector to another and which reduce from the upstream edge 64.3 to the downstream edge 64.4.

The number of transverse deflectors 76 and their shape are determined so as to obtain the same aerodynamic function as the cascades of the prior art, namely a flow rate which is sufficient in order to avoid operating problems of the fan of the engine 52 and an efficiency in terms of counter-thrust.

For the remainder of the description a transverse deflector or the transverse deflector 76 is understood to mean at least one transverse deflector 76 and an airflow or the airflow is understood to mean at least one airflow.

According to one feature of the invention, the orientation system 74 comprises at least one longitudinal deflector 78 which is secant to the transverse deflector(s) and oriented in a direction which forms an angle of less than 25° relative to the longitudinal direction.

Each longitudinal deflector 78 extends between the first and second ends 78.1, 78.2, oriented respectively upstream and downstream of the nacelle 54 and between the internal and external edges 78.3, 78.4, the internal edge 78.3 being closer to the diversion system 72 than the external edge 78.4.

According to one arrangement, the first and second ends 78.1, 78.2 of each longitudinal deflector 78 are respectively connected to the upstream and downstream ends 64.3, 64.4 of the lateral opening 64.

According to one configuration, the internal edges 76.3, 78.3 of each transverse deflector 76 and of each longitudinal deflector 78 are secant and positioned on the same surface and/or the external edges 76.4, 78.4 of each transverse deflector 76 and each longitudinal deflector 78 are secant and positioned on the same surface.

Figure 7:
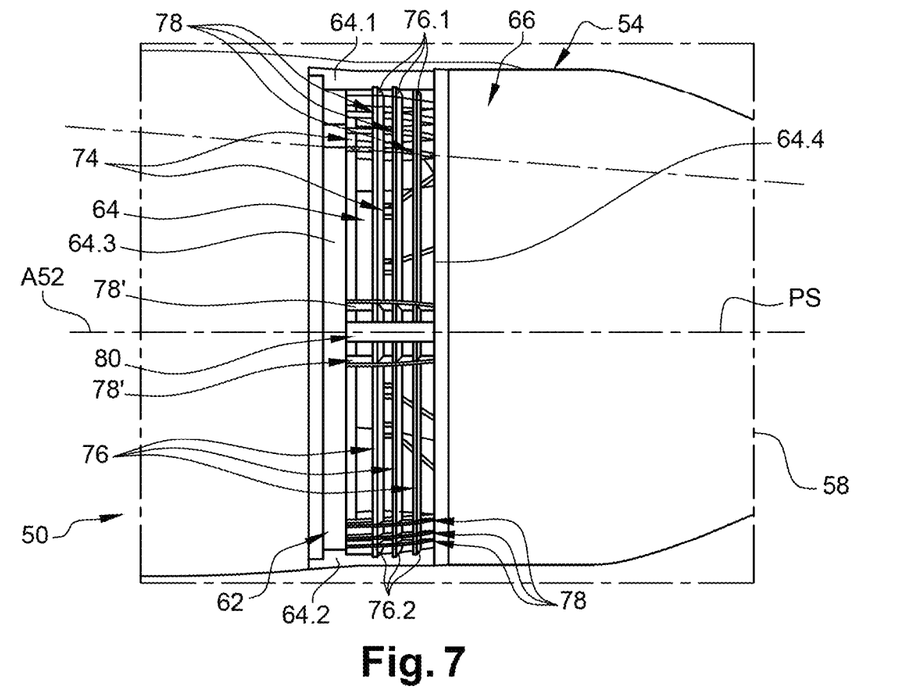
FIG. 7 is a lateral view of a part of a propulsion assembly composed of a thrust reversal device in the activated state illustrating an embodiment of the invention.

According to an embodiment which is visible in FIG. 7, the orientation system 74 comprises a plurality of longitudinal deflectors 78 positioned symmetrically relative to a plane of symmetry PS. According to one arrangement, the plane of symmetry PS is a horizontal longitudinal plane.

Figure 8:
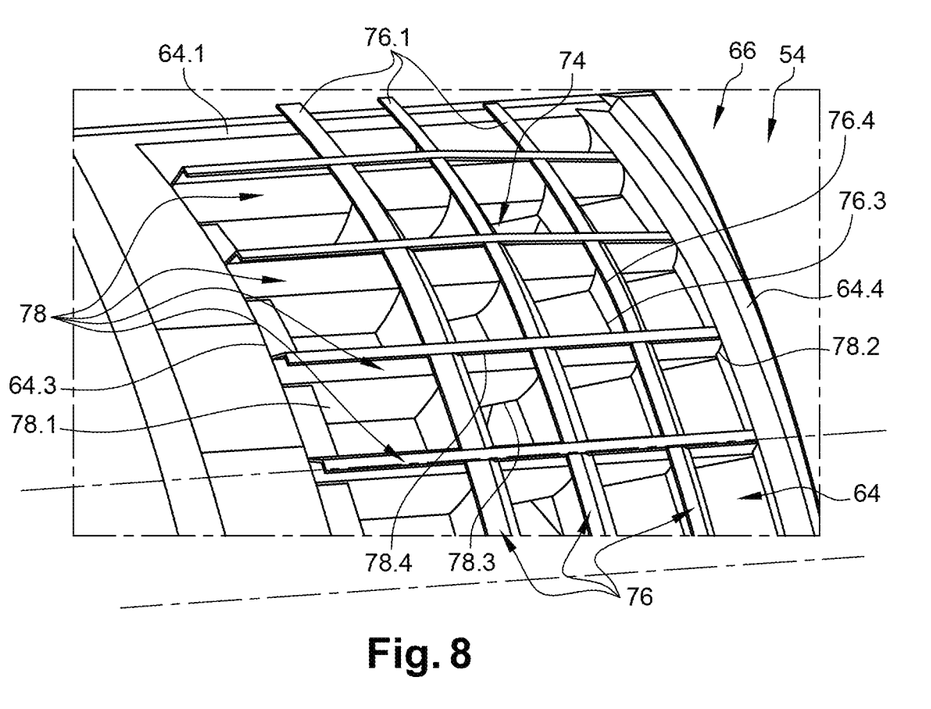
FIG. 8 is a perspective view of a part of an orientation system for the airflow of a thrust reversal device illustrating an embodiment of the invention.

According to one embodiment which is visible in FIG. 8, at least one longitudinal deflector 78 is orientated in a direction substantially parallel to the longitudinal direction and positioned in a longitudinal plane.

According to a further embodiment which is visible in FIG. 7, at least one longitudinal deflector 78 is oriented in a direction forming an angle of between 5° and 10° with the longitudinal direction.

According to one configuration, each longitudinal deflector 78 has a uniform height (distance between the internal and external edges 78.3, 78.4) between the first and second ends 78.1, 78.2.

Figure 9:
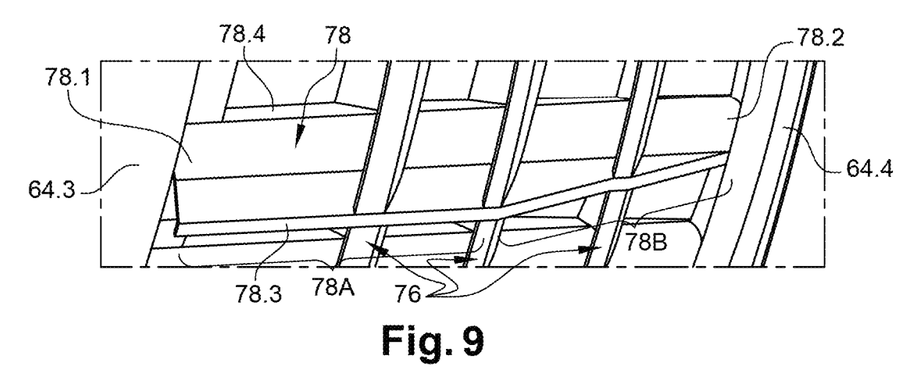
FIG. 9 is a lateral view of a longitudinal deflector illustrating an embodiment of the invention.
Figure 10:
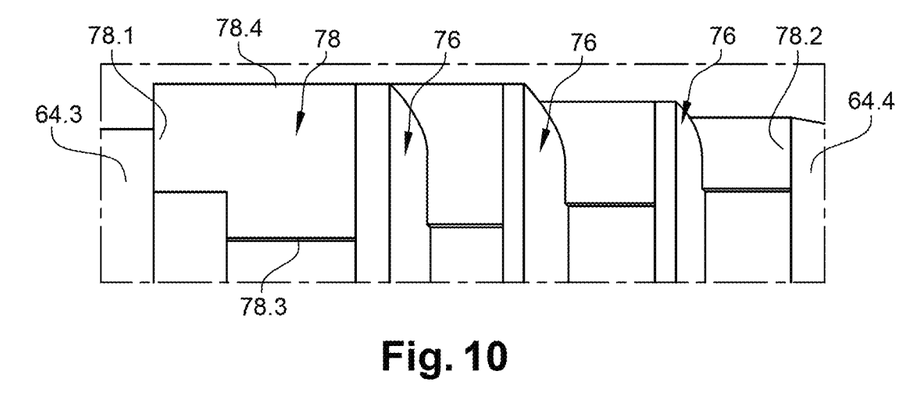
FIG. 10 is a lateral view of a longitudinal deflector illustrating a further embodiment of the invention.

According to further configurations which are visible in FIGS. 9 and 10, each longitudinal deflector 78 has a height which reduces regularly or incrementally from the first end 78.1 to the second end 78.2.

According to a configuration which is visible in FIG. 9, at least one longitudinal deflector 78 comprises an upstream part 78A which extends from the first end 78.1, the height being uniform in the region thereof, and a downstream part 78B which extends from the upstream part 78A to the second end 78.2, the height reducing progressively in the region thereof from the upstream part 78A of the second end 78.2.

According to a further configuration which is visible in FIG. 10, for at least one longitudinal deflector 78 the height thereof reduces incrementally from the first end 78.1 to the second end 78.2, the height thereof being substantially uniform between two consecutive transverse deflectors 76.

Figure 11:
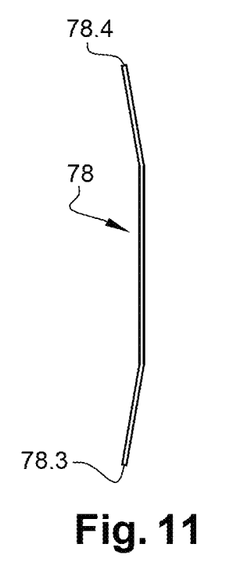
FIG. 11 is a cross section of a longitudinal deflector illustrating a first embodiment of the invention.
Figure 12:
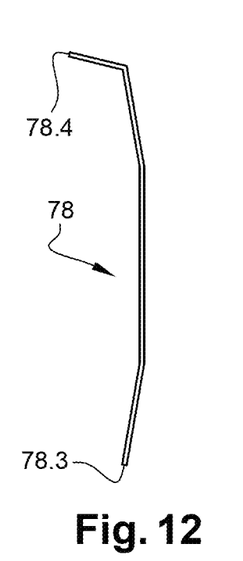
FIG. 12 is a cross section of a longitudinal deflector illustrating a second embodiment of the invention, and, FIG. 13 is a cross section of a longitudinal deflector illustrating a third embodiment of the invention.
Figure 13:
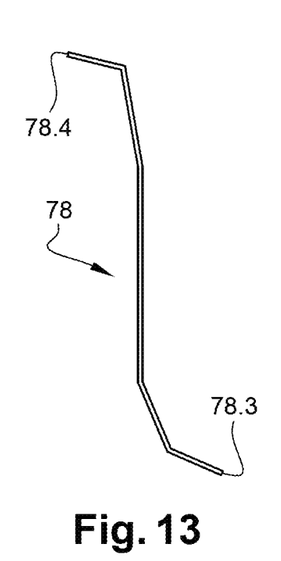

According to the embodiments which are visible in FIGS. 11 to 13, each longitudinal deflector 78 is in the form of a blade. According to a first embodiment which is visible in FIG. 11, this blade is substantially planar. According to a second embodiment which is visible in FIG. 12, for at least one longitudinal deflector 78 only the external edge 78.4 is curved. According to a further embodiment, for at least one longitudinal deflector 78 only the internal edge 78.3 is curved. According to a third embodiment which is visible in FIG. 13, the internal and external edges 78.3, 78.4 are curved. According to one configuration, the internal and external edges 78.3, 78.4 are curved in the same direction and the longitudinal deflector 78 has a C-shaped cross section. According to a further configuration which is visible in FIG. 13, the internal and external edges 78.3, 78.4 are curved in opposing directions and the longitudinal deflector 78 has a Z-shaped cross section.

According to one embodiment which is visible in FIG. 7, the orientation system 74 comprises a central longitudinal deflector 80 which has a T-shaped or V-shaped cross section and which is positioned in the region of the plane of symmetry PS, and lateral longitudinal deflectors 78 which are positioned symmetrically relative to the plane of symmetry PS. According to one arrangement, between the central longitudinal deflector 80 and each upper or lower edge 64.1, 64.2 of the lateral opening 64 the orientation system 74 comprises a plurality of lateral longitudinal deflectors 78, slightly spaced apart from one another, substantially parallel to one another and closer to the upper edge or lower edge 64.1, 64.2 of the lateral opening 64 than the central longitudinal deflector 80, and a lateral longitudinal deflector 78' slightly spaced apart from the central longitudinal deflector 80.

Whatever the embodiment, the orientation system 74 comprises at least one longitudinal deflector 78 orientated in a direction which forms an angle of less than 25° with the longitudinal direction. This longitudinal deflector 78 is configured to orientate the airflow diverted by the diversion system 72 in at least one direction which forms an angle with a radial direction. Thus even if the transverse deflectors 76 orientate the airflow diverted by the diversion system 72 in a substantially uniform manner over the circumference of the nacelle 54, each longitudinal deflector 78 enables the airflow diverted by the diversion system 72 to be oriented in a given direction in a transverse plane. Thus the presence of at least one longitudinal deflector 78, 80 improves the efficiency of the transverse deflector(s).

According to one embodiment, the orientation system 74 comprises at least one zone which extends over an angular sector of at least 20° in a transverse plane without longitudinal deflectors 78. Thus in this zone two consecutive longitudinal deflectors 78 are spaced apart by an angle of at least 20° in a transverse plane.

The longitudinal deflectors 78 are spaced apart from one another by an interval which can vary over the circumference of the nacelle. The longitudinal deflectors 78 are closer and spaced apart by a small angular sector in the order of 5° to 20° in the zones of the lateral opening 64 opposing an obstacle such as the ground or the fuselage and are spaced apart by an angular sector of greater than 30° outside these zones.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

Claimed is:

1. An aircraft nacelle comprising:
    an external surface extending between an upstream end and a downstream end and which is configured to channel an airflow flowing in a longitudinal direction from the upstream end to the downstream end; and,
    at least one thrust reversal device which comprises:
        at least one lateral opening which is spaced apart from the upstream end and the downstream end and which passes through the nacelle,
        at least one translating mobile part configured to adopt a first position corresponding to an inactivated state of the at least one thrust reversal device and in which the at least one mobile part closes off the at least one lateral opening, and a second position corresponding to an activated state of the at least one thrust reversal device and in which the at least one mobile part at least partially opens up the at least one lateral opening, at least one diversion system configured to adopt a first position when the at least one thrust reversal device is in the inactivated state in which the at least one diversion system does not interfere with the airflow channeled in the nacelle, and a second position when the at least one thrust reversal device is in the activated state in which the at least one diversion system interferes with the airflow channeled in the nacelle and orientates the airflow in radial directions toward the at least one lateral opening, and, at least one orientation system which is configured to orientate the airflow diverted by the at least one diversion system, wherein the orientation system comprises:

at least one transverse deflector positioned approximately in a plane perpendicular to the longitudinal direction and which is configured to orientate the airflow diverted by the at least one diversion system in the radial directions and toward the upstream end of the nacelle, and, at least one longitudinal deflector secant to the at least one transverse deflector and which is angled from a downstream end of the at least one lateral opening radially outwardly to an upstream end of the at least one lateral opening and oriented in a direction which forms an angle of less than 25° with the longitudinal direction.

2. The aircraft nacelle according to claim 1, wherein the at least one lateral opening is delimited by upper and lower edges substantially parallel to the longitudinal direction and by upstream and downstream edges positioned in substantially transverse planes, and wherein each at least one longitudinal deflector comprises first and second ends respectively connected to upstream and downstream ends of the at least one lateral opening and internal and external edges, the internal edge being closer to the at least one diversion system than the external edge.

3. The aircraft nacelle according to claim 2, wherein each longitudinal deflector has a height which reduces from the first end to the second end.

4. The aircraft nacelle according to claim 3, wherein the at least one longitudinal deflector comprises an upstream part which extends from the first end, a height being uniform in a region of the upstream part, and a downstream part which extends from the upstream part to the second end, the height reducing progressively from the upstream part to the second end.

5. The aircraft nacelle according to claim 3, wherein the height reduces incrementally from the first end to the second end, the height being substantially uniform between two consecutive transverse deflectors.

6. The aircraft nacelle according to claim 3, wherein the at least one orientation system comprises a plurality of longitudinal deflectors positioned symmetrically relative to a plane of symmetry.

7. The aircraft nacelle according to claim 6, wherein the at least one longitudinal deflector of the at least one orientation system comprises a central longitudinal deflector which has a T-shaped or V-shaped cross section and which is positioned in a region of the plane of symmetry, and the at least one longitudinal deflector of the at least one orientation system further comprises a plurality of lateral longitudinal deflectors which are positioned symmetrically relative to the plane of symmetry between the central longitudinal deflector and each upper or lower edge of the at least one lateral opening, wherein two or more lateral longitudinal deflectors of the plurality of longitudinal lateral deflectors are slightly spaced apart from one another, substantially parallel to one another and closer to the upper or lower edge of the lateral opening than the central longitudinal deflector, and at least one lateral longitudinal deflector of the plurality of longitudinal lateral deflectors is slightly spaced apart from the central longitudinal deflector.

8. The aircraft nacelle according to claim 1, wherein the at least one longitudinal deflector is oriented in a direction substantially parallel to the longitudinal direction and is positioned in a longitudinal plane.

9. The aircraft nacelle according to claim 1, wherein the at least one longitudinal deflector is oriented in a direction forming an angle of between 5° and 10° with the longitudinal direction.

10. The aircraft nacelle according to claim 1, wherein each longitudinal deflector comprises a blade.

11. An aircraft comprising:
at least one aircraft nacelle according to claim 1.

12. The aircraft nacelle according to claim 1, wherein the at least one longitudinal deflector has a length extending from a downstream edge of the at least one lateral opening radially outwardly to an upstream edge of the at least one lateral opening and the angle extends over the length of the at least one longitudinal deflector.

* * * * *